2,786,391
INTERCHANGEABLE OPHTHALMIC MOUNTING

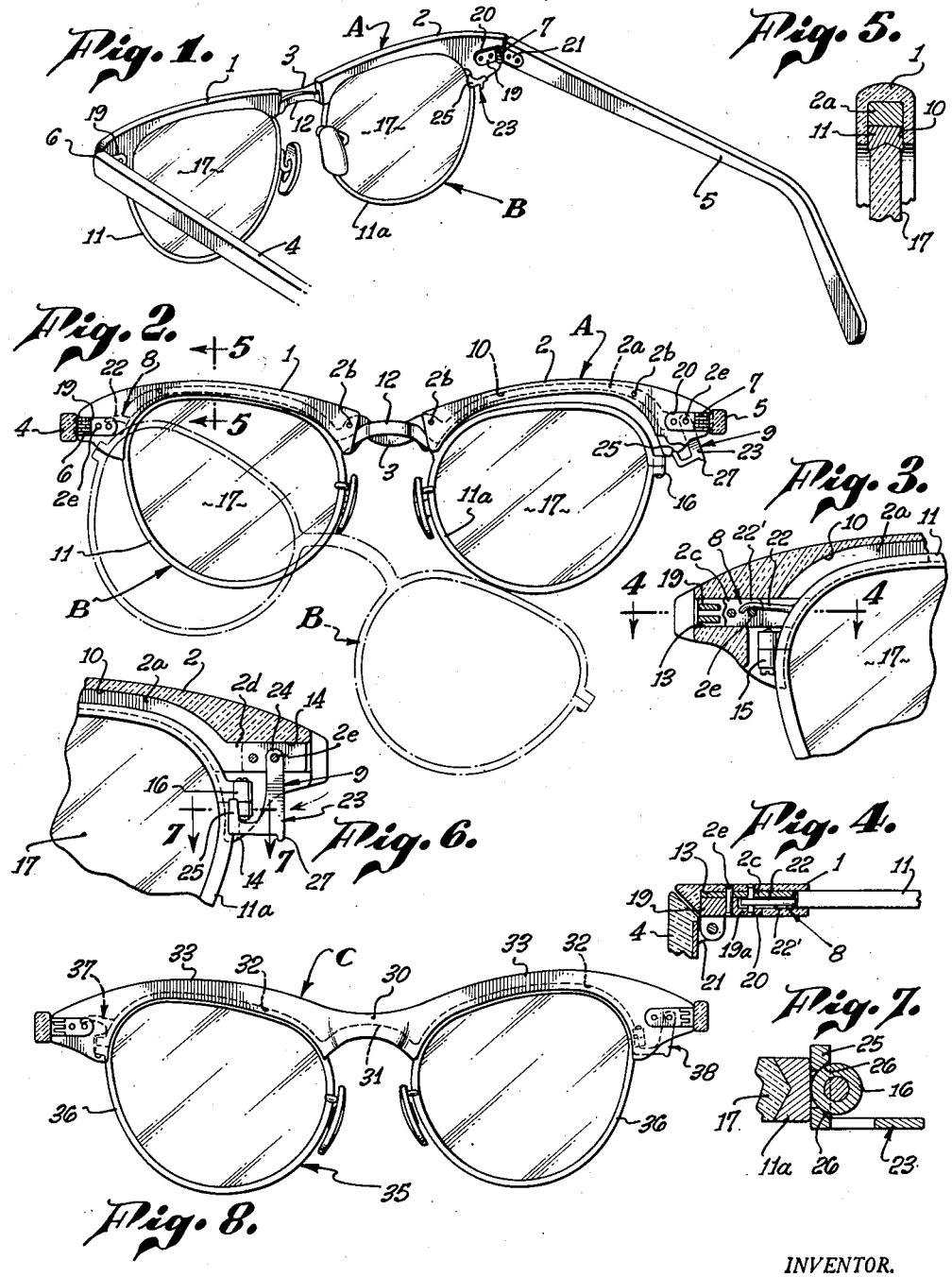

Harold R. Lutes, San Gabriel, Calif.

Application June 18, 1953, Serial No. 362,461

1 Claim. (Cl. 88—41)

This invention relates to ophthalmic mountings of the combination type now in vogue wherein spectacle frames are provided with contrasting and ornamental brow piece assemblies extending across the tops of the spectacle frames.

It is an object of the present invention to provide a novel brow piece assembly which is interchangeable with a spectacle assembly in a particularly efficaceous manner whereby variously colored and decorated brow piece assemblies selectively may be detachably mounted on the spectacle assembly, or various types of spectacle assemblies may be detachably connected with any one of a group of the variously ornamented brow piece assemblies.

It is another object of this invention to provide a combination spectacle unit such as described wherein a novel means for detachably fastening the brow piece assembly to the spectacle assembly contributes largely to the efficacy of the unit.

It is an additional object of this invention to provide an ophthalmic mounting such as described wherein the detachable ornamental brow piece assembly is constructed to fit on the spectacle assembly in a particularly snug and effective manner preventing accidental separation of the two assemblies and reinforcing the spectacle frame.

It is a further object to provide as one form of this invention, a brow piece assembly which conceals the upper edges of the rims and lenses in grooves in the brow piece assembly and is provided with a metal bridge piece which appears as though it is a part of the spectacle frame in keeping with present popular styling of eye glasses.

It is another object of this invention to provide a brow piece assembly such as described wherein a novel reinforcing element is mounted therein to effectively strengthen the assembly and provide the bridge piece thereof.

It is another object of this invention to provide a brow piece assembly including novel fastening means of such a nature that no appreciable change in the standard construction of the spectacle frames now in general use is required to provide for the attachment thereto of the brow piece assembly.

It is another object hereof to provide a brow piece assembly such as described which includes suitable temples wherein the hinge structures for the temples cooperate with fastening means on the brow piece in a manner making possible the use of simple and inexpensive as well as inconspicuous and easily operable fastening means for securely holding the brow piece assembly on the spectacle frame.

Further it is an object to provide a brow piece assembly such as described in which the fastening means for securing the brow piece assembly to the spectacle frame cooperate with the usual lugs, by which the lenses as secured in the rims of the frame, in a manner making possible a simple construction of the fastening means and preventing relative movement between the two assemblies in all directions.

An additional object of this invention is to provide a brow piece assembly such as described which encloses the rim lugs on the spectacle frame so as to conceal these lugs and portions of the fastening means as well as provide a secure attachment of the brow piece assembly to the spectacle frame.

This invention possesses many other advantages and has other objects which may be made more easily apparent from a consideration of one embodiment of the invention. For this purpose there are shown two forms in the drawings accompanying and forming part of the present specification. These forms will now be described in detail, illustrating the general principles of the invention; but it is to be understood that this detailed description is not to be taken in a limiting sense, since the scope of the invention is best defined by the appended claim.

Referring to the drawings:

Fig. 1 is a fragmentary perspective view of an ophthalmic mounting embodying the present invention;

Fig. 2 is an elevational view partly in section showing the manner of assembling the mounting shown in Fig. 1;

Fig. 3 is an enlarged fragmentary sectional view partly in elevation showing one of the two fastening means embodied in the mounting;

Fig. 4 is a horizontal sectional view taken on the line 4—4 of Fig. 3;

Fig. 5 is a sectional view taken on the line 5—5 of Fig. 2;

Fig. 6 is an enlarged view similar to Fig. 3 showing the other of the two fastenings embodied in the mounting;

Fig. 7 is a sectional view on an enlarged scale taken on the line 7—7 of Fig. 6; and Fig. 8 is an elevational view partly in section of a modified form of this invention.

Referring more specifically to the accompanying drawing it will be seen that a brow piece assembly A embodying the present invention is mounted as shown in Fig. 1, on a spectacle assembly B so that the two assemblies appear as a complete eye glass unit having a styling corresponding to that presently popular in eye glasses.

The brow piece assembly A includes a pair of like brow pieces 1 and 2 joined by a reinforcing element 2a riveted or otherwise fixed thereto and which provides a bridge piece 3. Temples 4 and 5 are secured to the outer ends of the brow pieces 1 and 2 by means of hinges 6 and 7. These brow pieces may be made of a suitable plastic material or of metal and in either case will be colored or styled to be in distinct contrast with the coloring or styling of the spectacle assembly B inasmuch as the purpose of the assembly A is to provide ornamentation in accordance with present styling trends in the eye glass field.

It is desired that the brow piece assembly A be subject to being easily removed and replaced to suit the user as to color and decorative pattern so as to match or blend with clothing ensembles or be appropriate for special social or other occasions. Accordingly, novel fastening means, generally designated 8 and 9, are provided to detachably secure the ends of the brow pieces to the spectacle frame.

A further consideration is that of combining the brow piece assembly with the spectacle assembly in a manner concealing the fact that the two assemblies are separable and giving to the complete unit the desired styling according to the present popular trend.

Accordingly, the two brow pieces are provided with longitudinal extending grooves 10 on the under sides thereof to accommodate in a snug fit the upper portions of the rims 11 and 11a of the frame of the spectacle assembly B.

As shown in Figs. 1–7, the bridge piece 3 of the assembly A is made as a part of the reinforcing element 2a and positioned so as to lie against the front of the bridge piece 12 of the spectacle frame whereby it will appear as though it is a part of the latter.

To accommodate the temple hinges 6 and 7 as well as the fastening means 8 and 9 for detachably securing the brow piece assembly to the spectacle assembly, the outer ends of the brow pieces 1 and 2 are enlarged so as to extend laterally outward from the spectacle rims. In these enlarged ends the grooves 10 terminate in recesses 13 and 14 to accommodate the hinges 6 and 7 as well as parts of the fastening means 8 and 9. The recesses 14 are adapted to receive and conceal therein the clamping lugs 15 and 16 on the rims 11 and 11a of the frame of the spectacle assembly A. These lugs are of the usual form for clamping the rims around the lenses 17, and when engaged in the recesses 14 aid in holding the brow piece assembly in place.

The reinforcing element 2a is riveted at 2b within the grooves 10 in the brow pieces 1 and 2 and terminates in end portions 2c and 2d of reduced thickness disposed in the recesses 13 so as to line the front walls of such recesses as shown in Figs. 3 and 6. These reduced ends are secured to the brow pieces by means of rivets 2e which also secure to the brow pieces the hinge leaves 19 of the hinges 6 and 7. The hinge leaves 19 are extended through openings 20 in the rear faces of the enlarged ends of the brow pieces 1 and 2 so as to be disposed in the recesses 13 in contact with the reduced end portion 2c and 2d, the outer faces of these hinge leaves being substantially flush with the rear faces of the brow pieces. The other hinge leaves 21 of the hinges 6 and 7 are fixed to the temples 4 and 5 and are hingedly connected with leaves 19 in the usual manner as shown in Fig. 4.

The fastening means 8 includes a pin-like projection 22 welded or otherwise fixed to the rim 11 above the lugs 15 and adapted to be inserted into a socket 22' formed as shown in Figs. 3 and 4, in the recess 13 of the brow piece. This socket is provided between a reduced portion 19a of the hinge leaf 19 and the reduced end 2c of the reinforcing element 2a. The projection 22 has a hook-like outer end which hooks over one of the rivets 2e to restrain withdrawal of the projection from the socket 22'.

The other fastening means 9 as shown in Fig. 6 is disposed for the most part within the recesses 13 and 14 in the brow piece 2 and includes a generally L-shaped clasp 23 pivoted as at 24 at the free end of its longer leg to one of the rivets 2e holding the hinge leaf 19 of the hinge 7 within the recess 13. In this connection, it should be noted that the hinge leaf 19 for the hinge 7 is constructed and arranged as is the hinge leaf 19 for the hinge 6 thereby providing in the recess 13 a space for pivotally mounting the clasp 23 on one of the rivets 2e. The shorter leg of the clasp 23 is provided on its outer end with an offset U-shaped catch or hook portion 25 adapted to be swung upwardly from beneath the lugs 16 on the rim 11a into embracing relation with these lugs as shown in Figs. 6 and 7. Opposed surfaces of the sides of the U-shaped catch or hook portion 25 are beveled as at 26 to fit snugly against the front and rear sides of the lugs 16 as shown in Fig. 7, thereby preventing relative movement of the lugs and catch in two directions. The lugs 16 are disposed within the recess 14 when engaged by the U-shaped portion 25 to aid in securely connecting the two assemblies against relative movement. With this arrangement the catch member 23 will prevent forward and rearward relative movement between the spectacle frame and the brow-piece assembly A as well as restrain relative longitudinal movement or other separating movement between the two assemblies.

When it is desired to attach the brow piece assembly to the spectacle assembly, the projection 22 is mounted as shown in Fig. 2 in the socket 22'. In inserting this projection the lugs 15 engage squarely in the recess 14 thereby aligning the spectacle frame with the grooves 10 in the brow pieces 1 and 2. The spectacle frame and brow piece assembly are now moved together about the fulcrum provided by pin 22 in the socket 22' so that the rims 11 and 11a are fitted in the grooves 10 in the brow pieces. The pivoted clasp 23 is now swung to move the U-shaped catch or hook portion 25 into latching engagement with the lugs 16 as previously described, thereby securely connecting the two assemblies. The swinging of the clasp 23 into and out of latching position is facilitated by a small finger piece 27 projecting from the juncture of the two legs of the clasp.

It is now apparent that the fastening means 8 and 9 as here provided make it possible readily to attach and detach the two assemblies. The means 8 and 9 are substantially concealed when the assemblies are connected, but a small inconspicuous portion of the clasp member 23 being visible.

As shown in Fig. 8 a modified form of this invention embodies a brow piece assembly C identical with the assembly A except that the bridge piece 30 thereof is grooved as at 31 in continuation of the grooves 32 in the two brow pieces 33 whereby the bridge piece of the spectacle frame 35 is engaged in the groove 31 while the rims 36 engage in the grooves 32 in the two brow pieces. Fastening means 37 and 38, identical with the fastening means 8 and 9, are provided for detachably mounting the brow piece assembly on the spectacle frame.

The bridge piece 30 is here shown as integral with the brow pieces but it may be made of metal and attached to the brow pieces if desired.

I claim:

In a brow piece assembly for attachment to a spectacle frame wherein said frame is provided with rims which are joined by a bridge piece and clamped around lenses by means including lugs projecting laterally from said rims; a pair of brow pieces joined by a bridge piece; said brow pieces and bridge piece having a continuous groove therein for reception of the rims and bridge piece of said frame; said groove terminating in recesses for reception of said lugs when said assembly is attached to said frames; and means for detachably securing said brow pieces to said rims; said last named means including a clasp pivoted at one end in one of said recesses; the other end of said clasp having portions thereon for engaging the front, rear and bottom of the lug on one of said rims.

References Cited in the file of this patent
UNITED STATES PATENTS

| 2,495,508 | Cleaver | Jan. 24, 1950 |
| 2,566,236 | Meddoff | Aug. 28, 1951 |
| 2,627,783 | Splaine | Feb. 10, 1953 |
| 2,738,709 | Matthews et al. | Mar. 20, 1956 |
| 2,748,654 | Rohrbach et al. | June 5, 1956 |